Feb. 13, 1962 W. C. JONES ET AL 3,021,436

TRANSISTOR MEMORY CELL

Filed March 11, 1959

INVENTORS W. C. JONES
P. G. RIDINGER

BY S. E. Hollander

ATTORNEY 3,021,436
TRANSISTOR MEMORY CELL

William C. Jones, Florham Park, and Philip G. Ridinger, Boonton, N.J., assignors to Bell Telephone Laboratories, Incorporated, New York, N.Y., a corporation of New York Filed Mar. 11, 1959, Ser. No. 798,746
9 Claims. (Cl. 307—88.5)

This invention relates to memory circuits and more particularly to memory circuits which employ a junction transistor as the basic memory element.

One of the basic two-state memory cells widely utilized in prior art arrangements is the Eccles-Jordan circuit. This circuit has two stable states of operation and includes two distinct, approximately identical, interconnected groups of equipment, one of which is energized for each operational state. This circuit is relatively complicated in design including at least two active circuit elements, and often encompassing two or more capacitive or inductive elements, a number of resistive elements, and one or more sources of potential.

It is therefore an object of this invention to provide an improved two-state memory cell utilizing a minimum number of components, thereby reducing the attendant complexity and cost.

Certain semiconductive devices utilized in electronic circuits, for example, pulse source circuits operating in conjunction with memory cells, are adapted to pass current in only a single direction or to produce pulses of but a single polarity. If such sources are used to provide pulses to memory cells, it is apparent that, without additional circuitry, pulses of only a single polarity will be available to operate the memory cells. In addition, in some situations these pulses of a single polarity are available at but a single terminal, as may be the case where the memory cell itself is utilized as a circuit for counting the number of pulses received from a single source.

The Eccles-Jordan circuit may be operated by pulses of but a single polarity available at a single terminal, but to be so operated, additional "steering" circuitry must be provided. This steering circuitry functions to guide input pulses to the two distinct portions of the circuit. The steering operation is controlled by the electrical condition of various points in the circuit at the time of input. However, the utilization of steering circuitry necessarily involves added complication and expense.

It is, therefore, another object of this invention to provide a memory cell having but a single input and capable of operation by pulses of but a single value of polarity, amplitude, and duration.

An additional undesirable feature of prior art memory cells and especially of the Eccles-Jordan cell inheres in the circuitry necessarily utilized to accomplish the specific concept of memory embodied therein. As alluded to heretofore, the Eccles-Jordan circuitry includes two distinct portions, one of which is operative for each memory state thereof. Specifically, one half of the circuitry is in the low impedance or "on" state for each of the two states of circuit operation. As one half of the circuitry is on in each operational state, the power consumption of the cell remains relatively high at all times. In many cases, it may be desirable to utilize the output of only half of the cell. In such a case, during the "off" state of that portion of the cell actually utilized, the opposite non-utilized portion of the circuitry is on and dissipating energy.

Another object of this invention is, therefore, to provide a basic memory cell for handling input information from a single source wherein power loss is minimized in all states of operation.

In certain circuits utilizing memory cells, such as binary counting circuits, it is desirable that the cells operate in a manner such that the input pulses may be utilized to accomplish circuit functions in addition to changing the state of the memory cell. In circuits of this nature wherein the memory devices are interposed in the current paths of the input pulses, it is manifestly difficult to make further utilization of any input pulse which upon its advent switches the memory devices to the high impedance state. Thus, in a circuit where the advent of an input pulse opens a switch or memory device so that the input pulse may not pass therethrough, the input pulse is blocked and may not be conveniently utilized by the succeeding portions of the circuit.

It is, therefore, another object of this invention to provide a memory cell wherein the basic memory device may be interposed in the main path of the input pulses without impeding the utilization of any of the input pulses by succeeding portions of the circuit.

In addition, it is an object of this invention, in one embodiment thereof, to provide a memory cell wherein operation margins are not critical so that the cell may be utilized in many varied situations.

Briefly, these objects are accomplished in accordance with aspects of this invention by a memory cell employing as the basic memory element a single, two-terminal, PNPN junction transistor which may illustratively be of the type disclosed in Patent 2,855,524 of W. Shockley, issued on October 7, 1958. The two-terminal PNPN transistor is a two-state device which operates in a high impedance state for currents therethrough of a value less than a predetermined value. For currents therethrough of a value greater than the predetermined value caused by the impression of a voltage of at least a first predetermined value thereacross, the transistor transfers to a low impedance state. Once in the low impedance state the necessary current for sustaining the transistor in that state is determined by a voltage very much lower than the first predetermined voltage. If the sustaining voltage is removed to reduce the current available below the minimum necessary to sustain the low impedance state, the transistor reverts to the high impedance state wherein it presents effectively an open circuit to the passage of current.

The transistor included in the present invention is, therefore, biased by a source which furnishes a potential of some value less than that necessary to switch it to the low impedance state; for example, the source potential might be approximately two-thirds of the required switching potential. The transistor is arranged in a series voltage dividing network between a first resistor and a resistor-capacitor parallel combination. The bias source is connected to apply potential across this series circuit. Consequently, in the high impedance state, substantially all of the source potential is across the transistor.

An input pulse of a potential slightly greater than the difference between the required switching potential and the source potential is provided to the series circuit, increases the potential across the transistor to a value greater than that required to provide sufficient current to switch the transistor, and switches the transistor to its low impedance state. As current flows, a voltage builds up on the capacitor in series with the PNPN transistor. The voltage build-up on the capacitor is not allowed to reach, during the first input pulse, a value such that insufficient voltage remains across the transistor to maintain sustaining current therethrough. This is accomplished by adjusting the values of the resistors, the capacitor and the duration of the input pulse. The resistors are additionally of such a value that when the input pulse is removed, sufficient sustaining current is provided by the source to maintain the transistor in the low impedance state. While in the low impedance state the capacitor is charged to a potential determined by the value of the potential furnished by the bias source and the value of the resistors of the voltage divider network.

Upon the advent of a second input pulse of the same polarity, amplitude, and duration as the first, the potential across the capacitor increases from this initial value to a value greater than that of the bias source potential. Consequently when the second input pulse is removed, the transistor lacks the necessary voltage to provide sustaining current therethrough, and it reverts to the high impedance state. Because the current path through the transistor is blocked, the capacitor discharges through the parallel resistor. Since the parallel resistor experiences the same voltage as the capacitor which in turn varies in potential with the transistor state, the value of voltage across the parallel resistor is at all times indicative of the transistor state, and an output may therefore be taken across this resistor.

More specifically, in one embodiment, means are provided to condition the input pulses with respect to the operating state of the PNPN transistor so that the values of various circuit parameters are rendered less critical. This is accomplished by providing, in series with the means for providing input pulses, a diode and a capacitor connected together in shunt, and a resistor connected to the opposite terminal of the PNPN transistor from the input means and between the input means and the shunt combination.

In this manner, first input pulses pass as spikes through the shunt capacitor to turn on the circuit due to the considerable back-biasing of the shunt diode provided by the PNPN transistor in the high impedance state. The second input pulses, on the other hand, overcome the minimal back-biasing provided by the PNPN transistor in the low impedance state, and pass in toto. Therefore, there is no build-up on the capacitor in series with the PNPN transistor during a first input pulse so that build-up can be neglected as a factor in the adjustment of the various circuit parameters.

It is a feature of this invention that a single two-terminal PNPN transistor is utilized as a basic memory element in a memory cell.

It is another feature of this invention that a capacitor is arranged in series with a two-terminal PNPN transistor to provide a voltage capable of switching the transistor between states.

Another feature of this invention is the arrangement including the biasing means, the input means, and the serially connected capacitor which provide for switching the PNPN transistor to its low impedance state coincidentally with the leading edge of a first input pulse and to the high impedance state coincidentally with the trailing edge of a second input pulse of the same polarity and value as the first pulse. Since the leading edge of a first input pulse switches the memory device to the low impedance state, the first input pulse may pass therethrough for utilization by subsequent portions of the circuitry even though the memory device lies in the path of the input pulses. In a similarly advantageous manner, since the trailing edge of a second input pulse switches the memory device to the high impedance state, the second pulse may pass therethrough for subsequent circuit utilization before the switching function occurs, even though the memory device lies in the input path.

Another feature of this invention in one embodiment is the use of a capacitor and a diode connected in shunt in the input circuitry and a feedback resistor connected thereto and across the PNPN transistor to condition pulses affecting the PNPN transistor with respect to the operating state thereof.

A complete understanding of this invention and of these and other features and objects thereof may be gained from consideration of the following detailed description and the accompanying drawing, in which.

Figures 1A, 1B, 2:
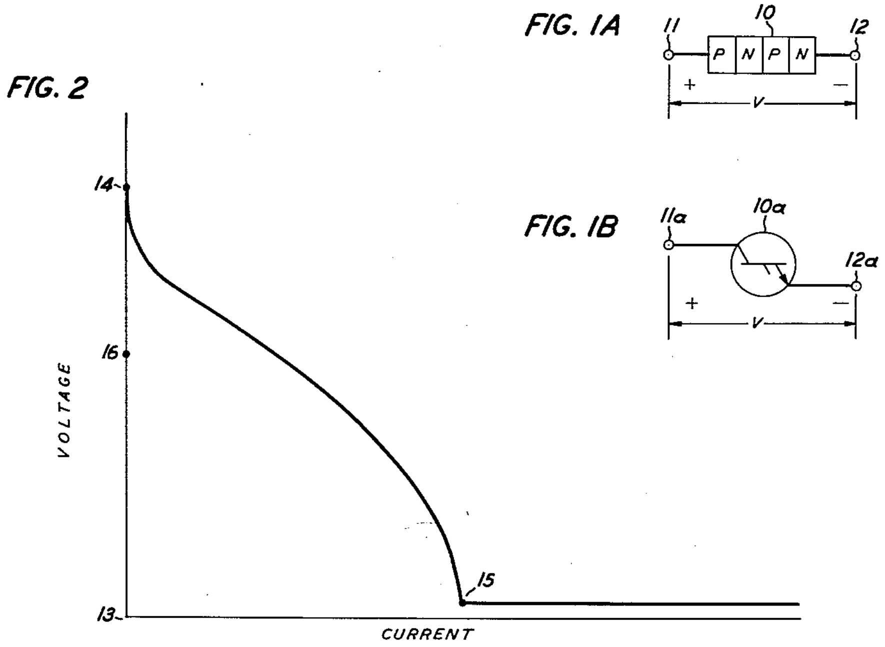
FIG. 1A is an illustration of a symbol for a two-terminal PNPN junction transistor.
FIG. 1B is an illustration of another symbolism used to represent a two-terminal PNPN transistor in the succeeding figures of the drawing.
FIG. 2 is a diagram illustrative, in the static condition, of the voltage across and the current through a PNPN transistor which may be utilized in the present invention.

Referring now to FIG. 1A there is shown a PNPN junction transistor 10. The transistor 10 is of a type disclosed in the above-referred to patent of W. Shockley, having a first terminal 11 and a second terminal 12. A potential V across the terminals 11 and 12 of the transistor 10 illustrates the correct polarity of a potential which, if in excess of a predetermined amplitude, causes the transistor 10 to switch to the low impedance state.

In FIG. 1B is illustrated in schematic form a symbol **10*a* used hereinafter to represent the type of two-terminal PNPN transistor 10 illustrated in FIG. 1A. The terminals 11 and 12 of FIG. 1A are identified in FIG. 1B as terminals 11*a* and 12*a***.

FIG. 2 is illustrative of the static voltage versus current characteristic for the transistor 10 illustrated in FIG. 1A. This characteristic is delineated by certain points of reference marked thereon. A first stable region of high impedance exists for currents of negligible value produced by voltages having values lying between a point 13 and a point 14, on the axis of ordinates of FIG. 2. The voltage at a point 16, noted in FIG. 2, is approximately two-thirds of the value of a voltage at the point 14. A second non-stable negative impedance region exists between the point 14 and a point 15 for values of current produced by voltages applied greater than that illustrated by the point 14. In this region the transistor 10 is switching to its low impedance state.

For currents greater than illustrated at the point 15, the transistor 10 operates in the low impedance state and requires sustaining voltages applied thereacross of very low value relative to the required switching potential. Conversely, if the current is reduced below the value at point 15, the transistor 10 switches back through the negative resistance region to the high impedance state.

Figure 3:
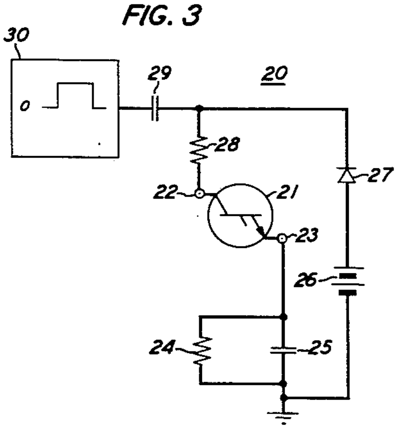
FIG. 3 is a schematic representation of a circuit of the invention utilizing a capacitive system of input.

Referring now to FIG. 3, there is shown a memory circuit 20 comprising a two-terminal PNPN junction transistor 21 having a first terminal 22 and a second terminal 23. The terminal 23 is connected to a parallel circuit which includes a resistor 24 and a capacitor 25. Both the resistor 24 and the capacitor 25 are connected to ground.

The transistor 21 is biased by a source of potential 26 connected to the terminal 22 through a diode 27 and a series resistor 28. The potential furnished by the source 26 is of a value inadequate to drive the transistor 21 into the low impedance state. For instance, the potential furnished by source 26 might be of a value equal to that shown at the point 16 in FIG. 2 or approximately two-thirds of the value of the potential shown at the point 14. It is obvious, then, that the transistor 21 will remain in its high impedance state if only the potential furnished by the source 26 is applied thereacross.

An input to circuit 20 is furnished through a capacitor 29 connected to the transistor 21 through the resistor 28. The input is in the form of a rectangular voltage pulse of a positive polarity. The input pulse is furnished by a source of input pulses 30 and is of a value of potential great enough so that, when acting jointly with the potential furnished by the source 26, the total potential across the transistor 21 causes switching to the low impedance state. The total value of the potential furnished by the source 30 and by the source 26 must be greater than the potential at the point 14 of FIG. 2; the value of potential furnished by the source 30 must therefore be greater than the voltage difference between points 16 and 14 of FIG. 2.

During the high impedance state of the transistor 21, a voltage equal to that furnished by the source 26 appears at the right terminal of capacitor 29. When an input pulse of sufficient amplitude is furnished by the source 30 to the circuit 20, the diode 27 back-biases, the voltage across the transistor 21 increases beyond the breakdown potential, and the transistor 21 is switched to its low impedance state to allow current flow therethrough. During the continuance of the input pulse from the source 30 a voltage build-up develops across capacitor 25, positive at the top of the capacitor 25 with respect to the bottom thereof.

The transistor 21 offers, in the low impedance state, a very small impedance to current with respect to that offered in the high impedance state; consequently, the value of the current therethrough is controlled in the main by the following parameters. The current is controlled by the value of the voltage applied across the transistor 21 and across the resistors 24 and 28, by the resistance of those resistors 24 and 28, and by the value of the capacitor 25. The magnitude of the resistors 24 and 28 must be adjusted so that the value of the voltage furnished during the input pulse provides sufficient current to switch the transistor 21 to, and maintain it in, the low impedance state. The values of the resistors 24 and 28, of the capacitor 25, and of the input pulse must further be adjusted so that, during the input pulse, the voltage build-up on the capacitor 25 is not such as to cause the current through the transistor 21 to drop below the sustaining value. Additionally, the resistors 24 and 28 must be so adjusted in value that upon the removal of the input pulse and the forward biasing of the diode 27, sufficient current is furnished by the source 26 to sustain operation in the low impedance state. In any case wherein sustaining current is removed the transistor 21 reverts to the high impedance state.

At the end of the first input pulse, diode 27 forward biases and the potential at terminal 22 is reduced almost instantly to the value of the bias supply 26 less the drop across the resistor 28. At the same time the voltage across capacitor 25 cannot change instantaneously and as a consequence the current through transistor 21 decreases abruptly. The circuit constants must be adjusted so that at this instant the current through transistor 21 is not decreased below the value necessary to sustain operation in the low impedance state. After the input pulse has been removed, the voltage across the capacitor 25 adjusts to a new level determined by the voltage divider action of the resistors 28 and 24 on the voltage furnished by the source 26 which new level is less than that which would remove sustaining current from the transistor 21.

The ratio of the resistor 24 to the resistor 28 determines the voltage level the capacitor 25 will take on during an infinite period in the sustaining state of the transistor 21. In order to assure proper circuit margins so that the transistor 21 will not switch to the high impedance state on the removal of a first input pulse and will in fact switch to that high impedance state upon the removal of a second input pulse, the resistor 24 must be chosen to have a proper value in relation to the resistor 28. With this adjustment, once the transistor 21 is in the low impedance state with only the source 26 connected thereto, it will remain in that state.

It is to be noted from FIG. 2 that the voltage required to sustain operation of the transistor 21 in the low impedance state is quite small relative to the voltage necessary to switch the transistor 21 to that state from the high impedance state. For example, in one such circuit 20 as shown in FIG. 3, the breakdown potential required to switch the transistor 21 to the low impedance state is approximately fifty-three volts while the required sustaining voltage amounts to less than one volt, a ratio of approximately fifty-three to one. There is very little dissipation of energy in the active element itself in the on or low impedance state so that power loss is effectively reduced to a minimum.

At all times during the input pulse and the sustaining operation of the circuit 20, an output indicative of the low impedance state of operation of the transistor 21 may be realized by measuring the voltages across, for instance, either of the resistors 24 or 28 which vary with the condition of circuit operation. For example, the voltage across the resistor 28 is zero in the high impedance condition when no current is flowing and of some positive value in the low impedance state with current flow therethrough. The voltage across the resistor 24, on the other hand, is identical to that across the capacitor 25 which varies, as explained herein, with the condition of the transistor 21.

When a second input pulse of the same amplitude, duration and polarity as the first is received from the source 30, diode 27 is again reverse-biased and the voltage across the capacitor 25 begins to build up from an initial value determined by the action of the voltage divider network comprising the resistors 24 and 28 on the potential furnished by the source 26. The voltage across the capacitor 25 increases to a value such that upon the removal of the input pulse and the concomitant application of the voltage from the source 26 due to the forward biasing of the diode 27, the difference between the voltage furnished by the source 26 and that across the capacitor 25 is insufficient to furnish sustaining current to the transistor 21. Upon the removal of sustaining current, the transistor 21 reverts to the high impedance state of operation.

When the transistor 21 is switched to the high impedance state of operation, capacitor 25 discharges through the resistor 24 to produce an output indicative of the high impedance state. The time of discharge is controlled by the value of the resistor 24, of the capacitor 25 and of any impedance, not shown, in shunt therewith. The voltage across the capacitor 25 advantageously diminishes to ground by the advent of the next input pulse.

The values of the resistors 24 and 28 are chosen with the circuit time constants in mind. For instance, the time of voltage build-up on the capacitor 25 is controlled by the value of the capacitor 25 and the values of the resistors 24 and 28 while the time of discharge for the capacitor 25 is governed by the values of the resistor 24 and the capacitor 25.

It is necessary that the charging time constant be made sufficiently large relative to the width of the input pulse so that at the end of the first pulse, the voltage stored on capacitor 25 is not large enough to cause transistor 21 to switch back to its high impedance state. It is also necessary that the charging time constant be made sufficiently small relative to the width of the input pulse, so that at the end of the second input pulse the voltage stored on capacitor 25 is large enough to cause transistor 21 to switch to its low impedance state. Further, the discharge time constant relative to the interval between pulses advantageously is such as to allow almost complete discharge of the capacitor 25 or the circuit may switch back to the high impedance state upon the removal of the initial input pulse. The resistors 24 and 28 and the capacitor 25 must be adjusted with the foregoing in mind.

Additionally, the value of the capacitor 25 may be small with respect to the value of the capacitor 29 so that a rectangular input pulse is available to switch the condition of the transistor 21.

In accordance with the foregoing desiderata, the parameters of circuit 20 may take the following illustrative values:

| | |
|---|---|
| Capacitor **29** | 1 $\mu$d. |
| Capactior **25** | 0.0025 $\mu$d. |

| | |
|---|---|
| Resistor 24 | 10,000 ohms. |
| Resistor 28 | 8,500 ohms. |
| Source 26 | 40 volts. |
| Input pulse | 27 volts, 10 $\mu$sec. |
| Breakdown voltage of transistor 21 | 53 volts. |
| Sustaining potential and current of transistor 21 | 0.8–1 volt, 1.7 ma. |

It is of importance and should be emphasized that the transistor 21 is switched to the low impedance state of operation by the leading edge of a first input pulse and to the high impedance state of operation by the trailing edge of a second input pulse. In certain circuits utilizing the circuit 20 of the present invention, as for instance binary counting circuits, it is desirable that switching to the high impedance state be delayed from the advent of the input pulse to allow certain logical functions to be completed and the input pulses to be further utilized before the switching takes place, as mentioned supra. Circuit 20 is well adapted to such use due to the built-in delay provided by the circuitry which is adapted to switch the transistor 21 to the high impedance state on the advent of the trailing rather than leading edge of an input pulse.

Additionally, the circuit 20 might comprise in place of the diode 27 a resistor in which case it operates in a substantially identical manner as heretofore discussed.

Figure 4:
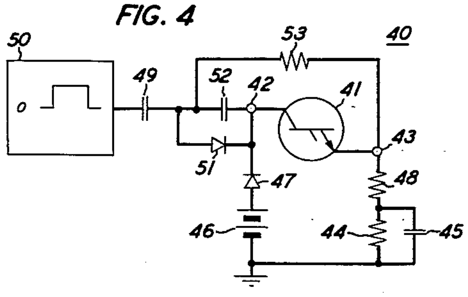
FIG. 4 is a schematic representation of a circuit of the invention including means for shaping input pulses.

Referring now to FIG. 4 there is shown a memory circuit 40 like that of circuit 20, with additional circuitry, including a two-terminal PNPN junction transistor 41 having terminals 42 and 43. Connecting the terminal 43 to ground is a resistor 48 connected in series to a parallel combination including a resistor 44 and a capacitor 45. A source of potential 46 is connected from ground through a diode 47 to the terminal 42 of the transistor 41. Rectangular input pulses are provided to the circuit 40 by a source of input pulses 50 through a capacitor 49. The capacitor 49 is connected in series with a parallel combination including a diode 51 and a capacitor 52 which are in turn connected to the terminal 42. A resistor 53 is provided connecting capacitor 49 to the terminal 43.

The circuit 40 operates in a manner similar to that of the circuit 20 of FIG. 3 except that additional circuitry is provided to improve circuit margins. Since the circuits of this invention are switched to the low impedance state by the leading edge of an input pulse, circuit means are provided in circuit 40 for shaping the pulse required for switching to the low impedance state to the form of an input spike. In this manner the voltage build-up across the capacitor 45 is not affected by the first input pulse but only by the value of the source 46.

During the period between input pulses in the high impedance state of the transistor 41, the diode 51 is back biased by the potential from the source 46 and ground applied over the resistors 44, 48 and 53. A first input pulse from the source 50, of a lesser value than the potential furnished by the source 46, is incapable of forward biasing the diode 51; and the input pulse is passed as an initial spike by the capacitor 52, which has a relatively small value compared to the capacitance of capacitor 49, to switch the transistor 41 to the low impedance state and initiate a voltage build-up on the capacitor 45.

After the transistor 41 has been operating in the low impedance state for a period of time so that the capacitor 52 is charged and the current through the resistor 53 has substantially subsided, the diode 51 is back biased, but by a potential less than priorly, equal to the very small potential across the transistor 41. Due to this reduction in the back-biasing, a second input pulse is great enough to forward bias the diode 51 thereby allowing the whole of that input pulse to pass to accomplish the switching of the transistor 41 to the high impedance state, as explained supra regarding FIG. 3. By allowing only a spike to trigger the circuit 40 to the low impedance state, the build-up on the capacitor 45 is not affected by the voltage of the first input pulse, and the transistor 40 is more easily held in the low impedance state on removal of the turn-on input pulse.

Figure 5:
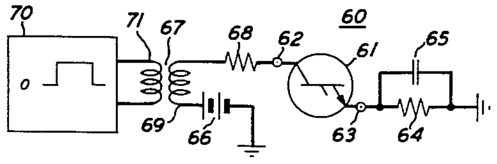
FIG. 5 is a schematic representation of a circuit of the invention utilizing a transformer system of input.

Referring now to FIG. 5, there is shown a circuit 60 including a two-terminal PNPN junction transistor 61 having a terminal 62 and a terminal 63. A resistor 64 and a capacitor 65 in shunt therewith connect the terminal 63 to ground. A source of potential 66 is connected to furnish potential to the transistor 61 through a first winding 69 of a transformer 67 and a resistor 68 connected to the terminal 62. Input pulses are furnished to the circuit 60 by a source of input pulses 70 which is connected to the transformer 67 at a second winding 71. The transformer 67 is adapted to provide rectangular voltage pulses in series with the voltage from the source 66 and of the same polarity as the voltage furnished thereby.

In operation, a first input pulse from the source 70 adds in series with the voltage from the source 66 to provide the requisite current through the transistor 61 to cause switching to the low impedance state. When the input pulse is removed, the transistor 61 is sustained in the low impedance state by the voltage and current provided by the source 66. During the first input pulse and after its removal, a voltage build-up occurs across the capacitor 65 less than adequate to remove sustaining potential from the transistor 61 but adequate to, with the additional build-up from a succeeding input pulse, remove that sustaining potential and switch the transistor 61 to the high impedance state.

It is to be understood that the above-described arrangements are illustrative of the application of the principles of the invention only. Numerous other arrangements may be devised by those skilled in the art without departing from the spirit and scope of the invention.

What is claimed is:

1. A bistable memory circuit comprising a semiconductor device having a first and a second terminal, said device being capable of operating in a high impedance state upon application of current therethrough of a value less than a predetermined value and in a low impedance state upon application of current therethrough of a value greater than said predetermined value; a source of potential capable of furnishing a first predetermined potential; a first and a second resistor serially connecting said source across said first and said second terminals of said device, the resistance of said resistors being such as to limit the current from said source of potential, when furnishing said first predetermined potential, below said predetermined value of current when said device is in the high impedance state and above said predetermined value of current when said device is in the low impedance state; current dependent chargeable means connected in shunt with said second resistor, said chargeable means operable to store a potential thereacross equal to the potential which would appear across said second resistor in the absence of said chargeable means; and means for increasing the potential furnished by said source to a second predetermined value such as to increase the current through said device above said predetermined value of current, said means being operable for a predetermined interval such that at the termination thereof the potential stored on said chargeable means is inadequate to reduce the current through said device below said predetermined value if said device was initially in the high impedance state, and is adequate to reduce the current through said device below said predetermined value if said device was initially in the low impedance state.

2. A memory circuit as in claim 1 wherein said semiconductor device comprises a two-terminal PNPN junction transistor.

3. A memory circuit as in claim 1 wherein said source of potential includes a battery and a diode connecting said battery to said device; and said means for increasing the potential furnished by said source includes a source of rectangular pulses of said predetermined interval, and a first capacitor connecting said source of pulses to said device.

4. A memory circuit as in claim 1 wherein said source of potential includes a battery, a transformer having a first and a second winding, and source of rectangular pulses of said predetermined interval, said battery connected serially with said second winding and said first resistor, and said source of pulses connected to said first winding.

5. A memory circuit comprising a semiconductor device having a first and a second terminal, said device being capable of operating in a high impedance state upon application of current therethrough of a value less than a predetermined value and in a low impedance state upon application of current therethrough of a value greater than said predetermined value; a source of potential capable of furnishing a first predetermined potential including a battery and a diode connected in series; a first and a second resistor serially connecting said source across said first and said second terminals of said device, the resistance of said resistors being such as to limit the current from said source of potential, when furnishing said first predetermined potential, below said predetermined value of current when said device is in the high impedance state and above said predetermined value of current when said device is in the low impedance state; current dependent chargeable means connected in shunt with said second resistor, said chargeable means operable to store a potential thereacross equal to the potential which would appear across said second resistor in the absence of said chargeable means; means for increasing the potential furnished by said source to a second predetermined potential such as to increase the current through said device above said predetermined value of current, said means being operable for a predetermined interval such that at the termination of the operation thereof the potential stored on said chargeable means is inadequate to reduce the current through said device below said predetermined value if said device was initially in the high impedance state, and is adequate to reduce the current through said device below said predetermined value if said device was initially in the low impedance state, said means for increasing the potential furnished by said source including a source of rectangular pulses of said predetermined interval, and a first capacitor connected to said source of pulses; a feedback resistor connecting said first capacitor to said second terminal of said device; and a diode and a second capacitor connected in shunt and joining said first capacitor to said first terminal of said device for conditioning the duration of the effect on said chargeable means of pulses from said source of pulses in response to the impedance state of said device.

6. A memory cell comprising a current dependent bistable element having a high impedance and a low impedance state, a source of potential, circuit means including a first capacitor connecting said source of potential in series with said bistable element, a source of input pulses, input means including a second capacitor and a diode in shunt therewith connecting said source of input pulses to said bistable element, and means for conditioning the conduction state of said diode in response to the impedance condition of said bistable element.

7. A memory cell as in claim 6 wherein said means for conditioning the conduction state of said diode includes circuit means connecting said diode to measure the voltage across said bistable element.

8. A memory cell comprising a PNPN transistor having a first and a second terminal, a source of potential, a first diode connecting said source of potential to said first terminal, a first and a second resistor connected in series between said source of potential and said second terminal of said transistor, a first capacitor connected in shunt with said second resistor, a source of input pulses, a second capacitor and a second diode connected in shunt and connecting said source of input pulses to said first terminal of said transistor, and a third resistor connected between said second terminal of said transistor and said second diode.

9. A memory cell comprising a PNPN transistor having a first and a second terminal, a source of potential, a first resistor and a diode serially connecting said source of potential to said first terminal, a second resistor and a capacitor in shunt therewith serially connecting said source of potential to said second terminal, and a source of input pulses connected to said first resistor.

References Cited in the file of this patent

UNITED STATES PATENTS

| | | |
|---|---|---|
| 2,418,516 | Lidow | Apr. 8, 1947 |
| 2,585,078 | Barney | Feb. 12, 1952 |
| 2,727,146 | Fromm | Dec. 13, 1955 |
| 2,787,717 | Kasmir | Apr. 2, 1957 |
| 2,850,646 | Ingham | Sept. 2, 1958 |
| 2,890,353 | Van Overbeek | June 9, 1959 |

FOREIGN PATENTS

| | | |
|---|---|---|
| 166,800 | Australia | Feb. 6, 1956 |